United States Patent [19]

Brodsky

[11] Patent Number: 4,489,256
[45] Date of Patent: Dec. 18, 1984

[54] PRIMARY AND SECONDARY DYNAMIC BRAKING SYSTEM

[75] Inventor: Stephen L. Brodsky, Camarillo, Calif.

[73] Assignee: Everest & Jennings, Inc., Camarillo, Calif.

[21] Appl. No.: 565,295

[22] Filed: Dec. 27, 1983

[51] Int. Cl.³ ............................................. H02P 3/14
[52] U.S. Cl. ...................................... 318/87; 318/57; 318/60; 318/62; 318/63; 180/907
[58] Field of Search ................... 318/56, 57, 60, 63, 318/86, 87, 62; 180/907

[56] References Cited

U.S. PATENT DOCUMENTS

| | | | |
|---|---|---|---|
| 1,136,621 | 4/1915 | Shallcross | 318/63 |
| 3,218,537 | 11/1965 | Stamm | 318/274 |
| 3,305,712 | 2/1967 | Hoffman | 318/63 |
| 4,157,123 | 6/1979 | Rodaway | 318/380 X |
| 4,296,361 | 10/1981 | Archer | 318/57 X |
| 4,369,397 | 1/1983 | Read | 318/53 X |
| 4,387,325 | 6/1983 | Klimo | 318/71 |
| 4,415,049 | 11/1983 | Wereb | 318/60 X |

Primary Examiner—J. V. Truhe
Assistant Examiner—Bentsu Ro
Attorney, Agent, or Firm—Ralph B. Pastoriza

[57] ABSTRACT

A dynamic braking system is provided for electrically driven wheelchairs to slow the wheelchairs to a stop without needing to use a mechanical brake. A primary switch arrangement is provided for connecting resistors across the right and left wheelchair motors automatically when the switch control is in its off position, either because of purposely positioning the control by the patient or as a consequence of power failure. In addition, a secondary switching system is automatically actuated in response to the primary switching system being moved to its off position to cross connect or short circuit the terminals of the right and left motors to each other only after a given period of time to provide a secondary braking action to the motors and bring the wheelchair to a complete rest.

3 Claims, 3 Drawing Figures

PRIMARY AND SECONDARY DYNAMIC BRAKING SYSTEM

FIELD OF THE INVENTION

This invention relates to the dynamic braking of electric motors and more particularly to an improved primary and secondary dynamic braking system particularly applicable to wheelchair motors.

BACKGROUND OF THE INVENTION

For safety reasons, it is desirable to provide dynamic braking for electrically driven wheelchairs in addition to a conventional mechanical brake. Basically dynamic braking involves connecting a resistance across the motor leads so as to be in series with the motor. The back electro-motive force (emf) of the motor is now shorted through this resistance and gently slows the motor to some predetermined rpm which is governed by the value of the resistances and the amount of inertia of the motor load.

The provision of dynamic braking resistances across the motor leads provides further advantages in the absorption of back voltage spikes. U.S. Pat. No. 4,157,123 issued to Everest & Jennings, Inc., the same assignee as the instant invention, is an example of such a dynamic braking system for wheelchairs.

Further safety and advantages could be realized if a system were provided enabling the slowing of the wheelchair to substantially zero rpm following the action of the conventional dynamic braking utilizing a resistance. Any such secondary braking action should "blend in" with the primary action to avoid any jerking. In other words, a smooth deceleration is most desirable.

BRIEF DESCRIPTION OF THE PRESENT INVENTION

With the foregoing in mind, the present invention contemplates the provision of a primary and secondary dynamic braking system particularly useful for wheelchair motors wherein the wheelchair speed can be reduced to substantially zero rpm in a smooth and efficient manner.

Basically, in its broadest aspect, there is provided a resistance means together with primary switch means movable from a normal off position in which the resistance means is connected across the terminals of the motor to provide dynamic braking to an on position in which the resistance means is removed and normal power applied to the motor for conventional operation. A secondary switch means, in turn, has a normal off position in which the terminals of the motor are shorted together and an on position in which the short between the terminals of the motor is removed. The arrangement is completed by the provision of a timing circuit means responsive to operation of the primary switch to its on position to move the secondary switch from its off to its on position and further responsive to movement of the primary switch back to its off position to move the secondary switch back to its off position only after a given period of time has elapsed. The latter action of the secondary switch increases the amount of braking action and in the case of a wheelchair incorporating right and left motors, will slow both motors at the same rate.

BRIEF DESCRIPTION OF THE DRAWINGS

A better understanding of this invention will be had by referring to a preferred embodiment thereof as illustrated in the accompanying drawings in which.

DETAILED DESCRIPTION OF THE PREFERRED EMBODIMENT

Figure 1:
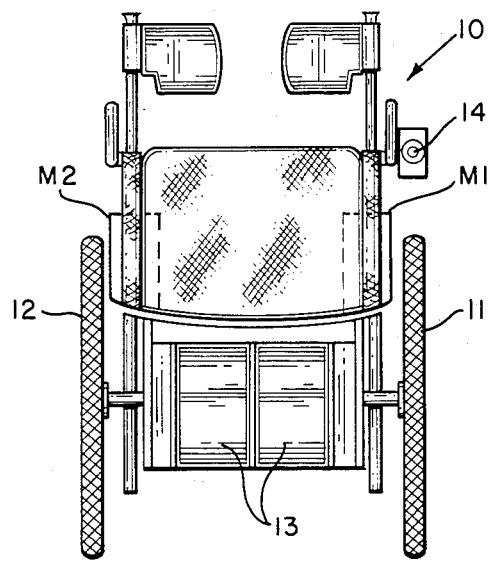
FIG. 1 is a top plan view of a wheelchair having right and left motors and incorporating the primary and secondary dynamic braking system of this invention.

Referring to FIG. 1, there is shown in plan view a power driven wheelchair 10 having right and left motors M1 and M2 for driving respectively right and left main wheels 11 and 12. Batteries 13 are provided for powering the wheelchair motors M1 and M2. Control of the motors is by way of a "joy" stick 14 operable by the patient.

In accord with the present invention as briefly described heretofore, there is first provided a primary braking condition effected by connecting resistances across the right and left motors to gently slow the motors by dynamic braking action to some predetermined rpm governed by the value of the resistances and the amount of inertia of the rolling wheelchair. This first braking action is depicted by the smooth curve 15 indicating that the wheelchair has been slowed to a given chair speed or rpm after a given time period indicated at T1. Thereafter, a secondary braking action is effected by cross connecting the right and left wheelchair motors together, this secondary braking action bringing the wheelchair speed down to substantially zero rpm in a smooth and controlled manner as indicated by the curve 16.

Figure 3:
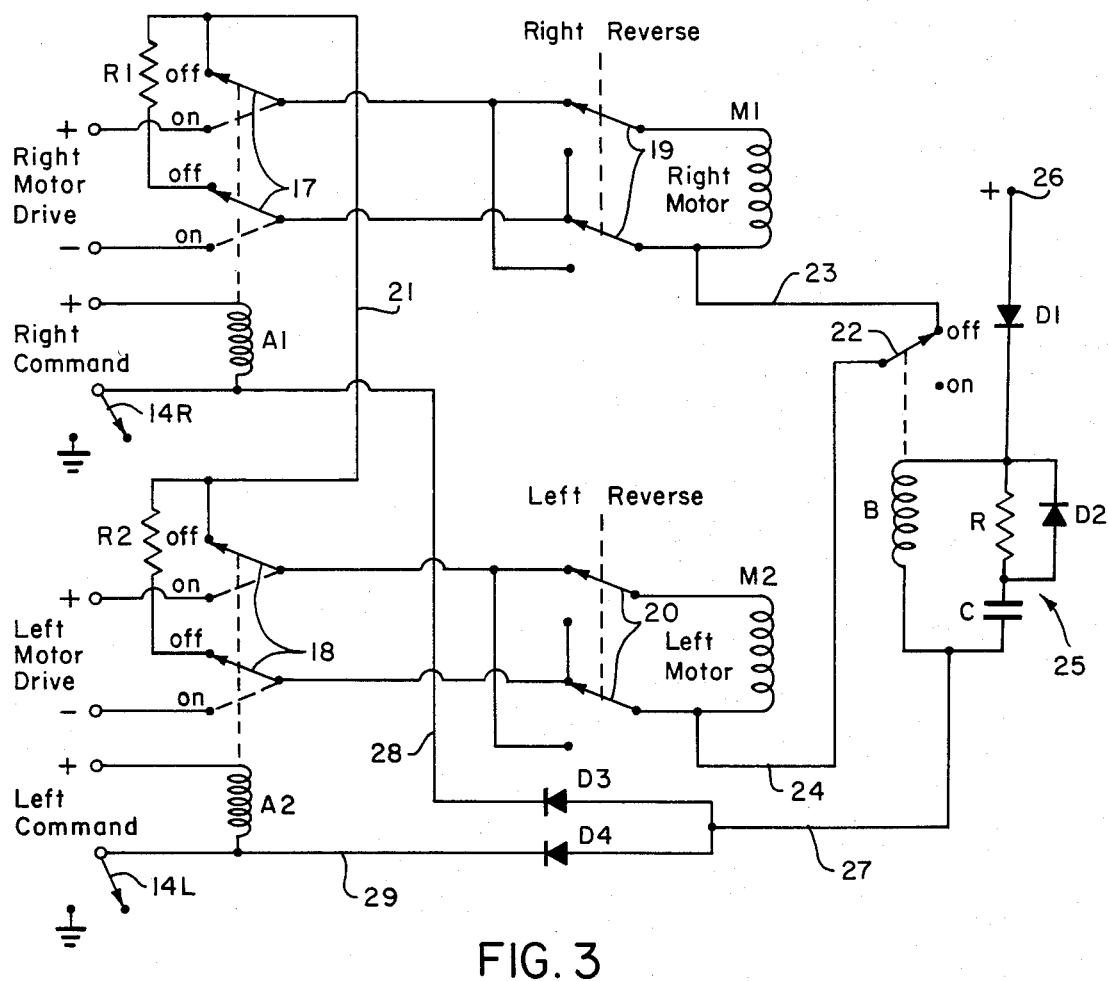
FIG. 3 is a schematic circuit diagram of the braking system incorporated in the wheelchair of FIG. 1 and having the characteristics depicted in FIG. 2.

The manner in which the foregoing characteristics are realized, will now be understood by referring to the circuit diagram of FIG. 3 for providing the primary and secondary braking actions described.

Referring to the left portion of FIG. 3, there are shown dual switch arms 17 and 18 operable upon energization of relay coils A1 and A2. These primary switch arms are movable from off terminals wherein first and second resistors R1 and R2 are respectively connected across the terminals 19 and 20 of the right and left motors M1 and M2, to on positions in which power is provided to the motor terminals for conventional operation. It will also be noted that when both pairs of switches 17 and 18 are on the off terminals, the first terminals of the motors M1 and M2; that is, the upper terminals, are connected together by way of upper switch arm 17, lead 21 and upper switch arm 18.

Referring to the right portion of FIG. 3, there is shown a secondary switch arm 22 which is movable from an off terminal wherein the corresponding second terminals; that is, the lower one of the motor terminals 19 and the lower one of the motor terminals 20 are connected together as by lead 23, switch arm 22 and lead 24. These second terminals of the motors are disconnected when the secondary switch arm 22 moves from its off terminal to its on terminal.

The primary switch arms 17 for the right motor drive are controlled by a first relay A1 and the primary switch arms 18 for the left motor drive are controlled by a second relay A2. The secondary switch arm 22 on the right portion of FIG. 3, in turn, is controlled by a timing circuit means designated generally by the arrow 25.

Right and left reversing switches are depicted between the right and left motor terminals and the corresponding right and left primary switch arms 17 and 18 respectively.

OPERATION

Referring first to the left portion of FIG. 3, assume that right and left command signals are passed to the relays A1 and A2 by operation of the joy stick 14 described in FIG. 1. For example, if the patient wishes to operate the right motor, the switch arm 14R shown in FIG. 3 would be closed to ground to thereby energize relay A1 and throw switch arm 17 from the off position to the on position in which power is provided to the motor terminals 19 for the right motor M1. Similarly, operation of the switch arm 14L shown in the lower left portion of FIG. 3 to ground terminal will energize the second relay A2 to throw the switch arms 18 to their on positions and thereby provide power to the left motor terminals 20.

When either one or both of the relay coils A1 and A2 is energized, power will immediately pass from terminal 26 shown in the upper right of FIG. 3 through relay coil B, lead 27, one or the other of diodes D3 or D4 or both diodes to one or the other of leads 28 and 29 to ground, this immediate energization of relay coil B throwing secondary switch arm 22 from its off position to its on position thereby disconnecting the secondary or lower terminals of the motors M1 and M2. It will thus be understood that whenever the right or left motor is operated in a normal manner, the secondary switch arm 22 is immediately moved to its on terminal to disconnect the leads 23 and 24 connecting to the motor terminals.

If now either the right or left command is operated to its neutral or off position, the corresponding relay coil A1 or A2 will be de-energized to thereby permit the switch arm 17 or 18 to move to their normal off positions. In such off positions, it will be evident that the resistors R1 or R2 or both are connected across the terminals 19 and 20 of the right and left motors respectively. This action results in dynamic braking as described in FIG. 2 to slow the wheelchair gradually to a low rpm. When both switch arms 17 and 18 are in their off position so that neither motor is energized, the motors will be evenly dynamically braked by the resisitors R1 and R2 as described. It should also be noted that when both switch arms 17 and 18 return to their off positions, ground is removed from leads 28 and 29 and from the timing circuit 25. However, the secondary switch arm 22 will remain in its on terminal, since relay B will continue to be energized by stored energy in the capacitor C, this stored energy gradually discharging through resistor R, and the relay coil B. In other words, the capacitor C functions as a battery after ground has been removed from the lead 27 and the length of time of the discharge is dependent upon the time constant of R and C. The diode D2 assures that initial energization of the relay coil B by power from source 26 takes place whenever either one of the primary switch arms are operated resulting in ground appearing on lead 27.

Figure 2:
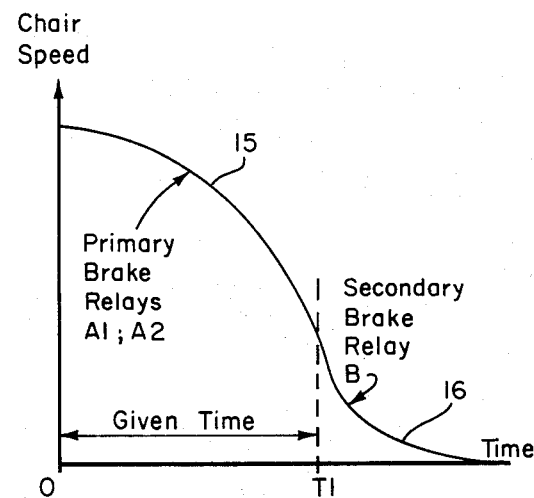
FIG. 2 is a plot showing the change in chair speed as a function of time when the primary and secondary brake system is in operation.

After the voltage across the capacitor C has been reduced a certain amount, the relay coil B will no longer hold the secondary switch arm 22 in its on terminal and the switch arm 22 will return to the off terminal at time T1 depicted in FIG. 2 thereby shorting the secondary terminals of the motors M1 and M2 by way of leads 23 and 24. This crossing of the motor leads not only increases the amount of brake action, but will slow the right and left motors at the same rate down to substantially zero rpm in a smooth manner as depicted in FIG. 2.

When either one or both of the primary switch means 17 and 18 are again operated to energize the right and left motors, the secondary switch arm 22 will then immediately be removed from the off terminal to the on terminal as described heretofore to disconnect the lower terminals of the motors M1 and M2.

As mentioned heretofore, the given period of time T1 described in FIG. 2 is a function of the time constant of the resistor R and the capacitor C. This time period T1 is also a function of the amount of charge accumulated on the capacitor C which in turn depends upon the length of time that the chair has been operating and thus to some extent its speed. In other words, it will take a longer time for the wheelchair to achieve a high forward speed with both motors energized than a lower rate of speed. This longer time will result in a higher charge on the capacitor C so that when the primary switches return to their off positions and dynamic braking starts, the secondary braking action will be delayed because of the increased time period resulting from the greater charge on the capacitor C. This delay will permit the rpm of the wheelchair to be reduced to the given rpm from the higher speed so that the secondary braking action will start at approximately the same lower rpm of the wheelchair to assure smooth continuity of the curves 15 and 16 described in FIG. 2.

From all of the foregoing, it will now be evident that the present invention has provided an improved dynamic braking system for electric motors and particularly useful for wheelchair motors wherein both primary and secondary braking action takes place to reduce the chair rpm to approximately zero without having to operate a mechanical brake.

I claim:

1. A primary and secondary dynamic braking system for first and second motors including, in combination:
   (a) first and second resistors;
   (b) first and second primary switches individually controllable from a normally off position in which said first and second resistors are connected across the terminals of said first and second motors to provide dynamic braking for said motors and in which first terminals of said first and second motors are connected together when both switches are off, to an on position to energize said first and second motors respectively for normal operation;
   (c) a secondary switch having a normal off position in which the first and second motors have their corresponding second terminals connected together and an on position in which said second terminals of said first and second motors are disconnected; and
   (d) a timing circuit means for operating said secondary switch responsive to operation of either of said primary first and second switches to their on positions to move said secondary switch to its on position and thereafter responsive to return of both of said primary first and second switches to their off positions for moving said secondary switch to its off position to reconnect said second terminals of said first and second motors only after a given period of time to thereby provide secondary braking to said motors.

2. The subject matter of claim 1, in which said given period of time is determined, at least in part, by the speed attained by said motors when said primary switches are in their on positions.

3. The subject matter of claim 1, including a wheelchair, said first and second motors being connected to drive the right and left main wheels of said wheelchair respectively, said primary switches being manually controllable by a patient seated in said wheelchair.

* * * * *